July 9, 1963
C. H. DUNNING
3,096,683
FILM PROJECTOR
Filed Aug. 28, 1959
5 Sheets—Sheet 1
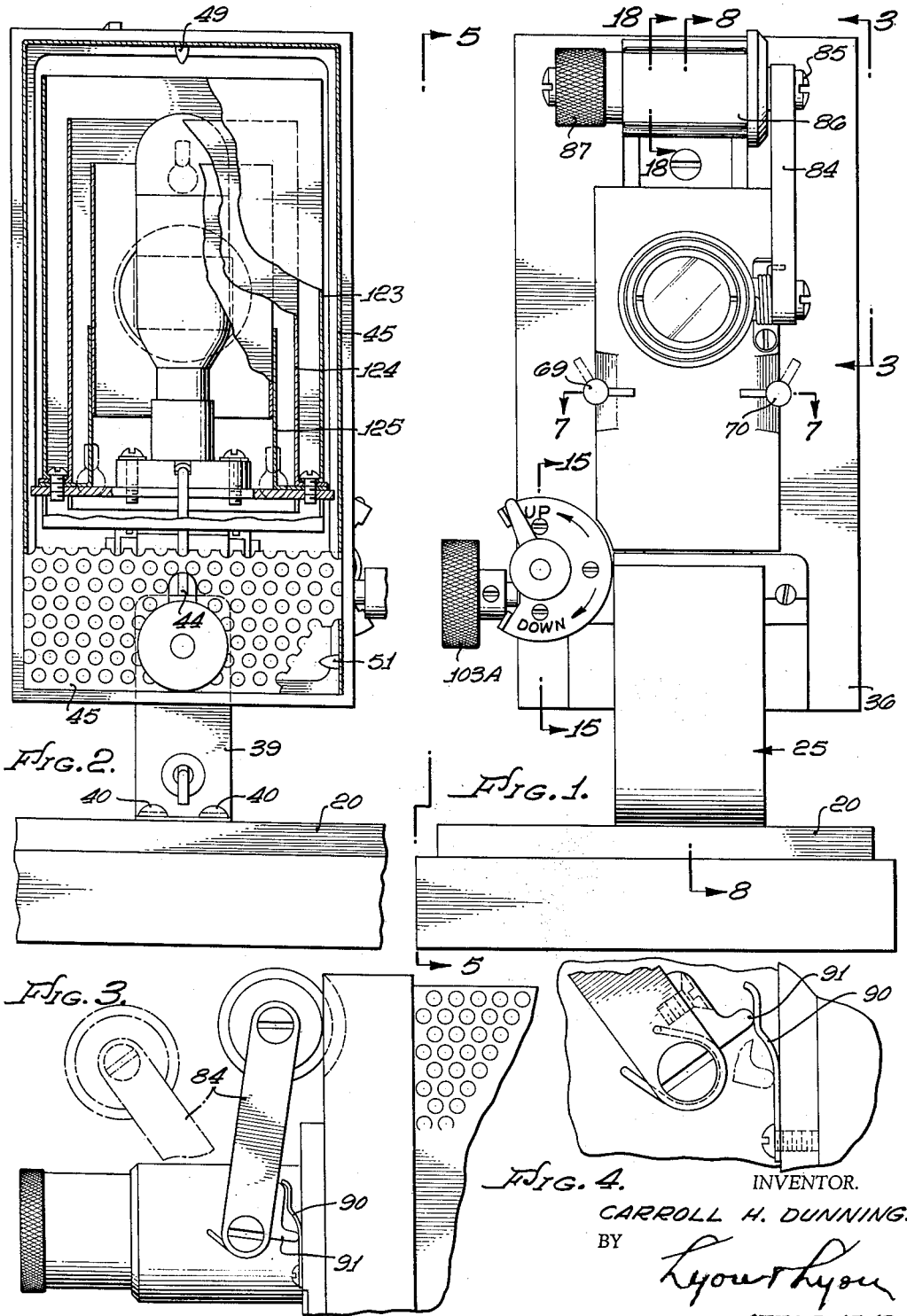
INVENTOR.
CARROLL H. DUNNING.
BY
Lyon & Lyon
ATTORNEYS.

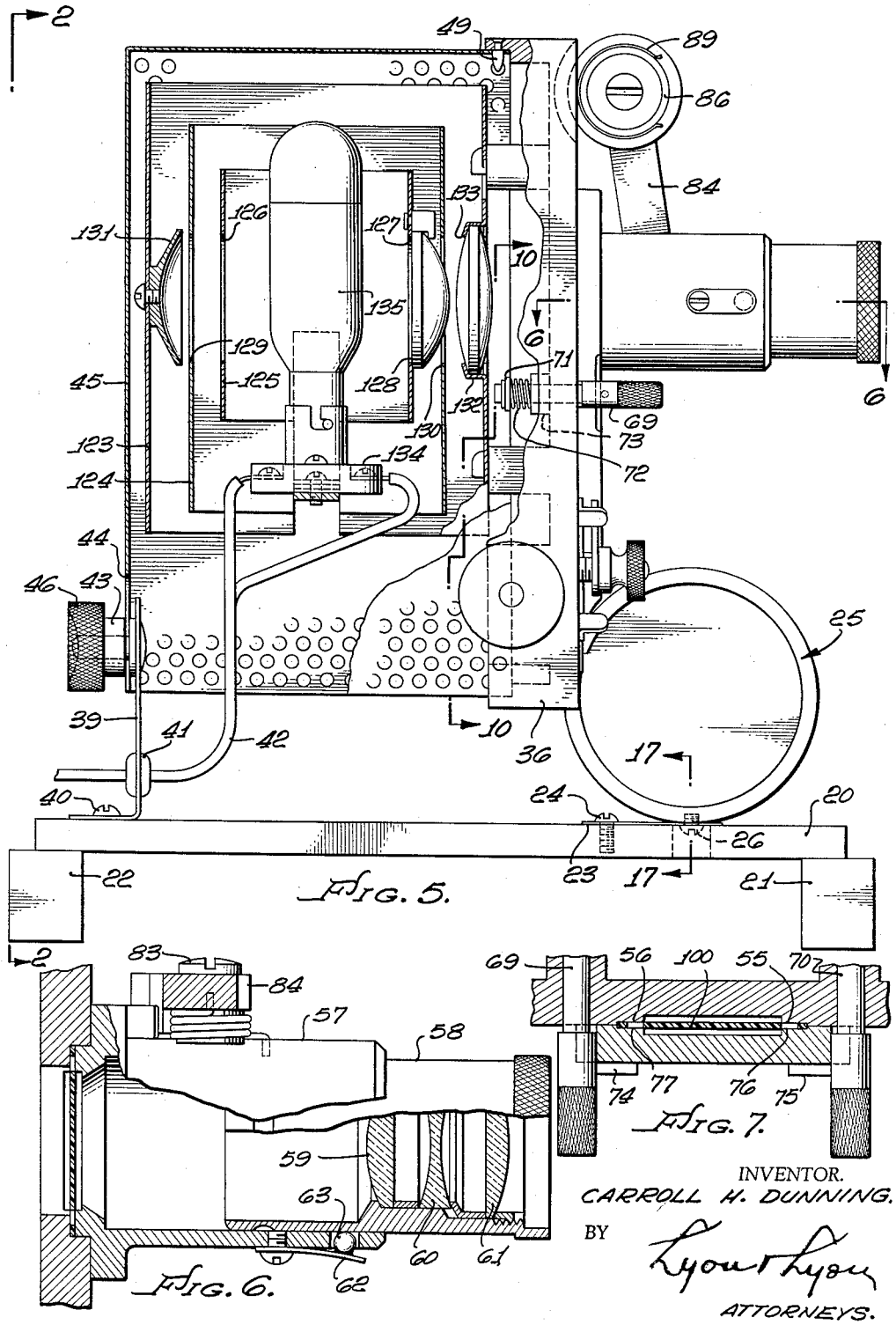

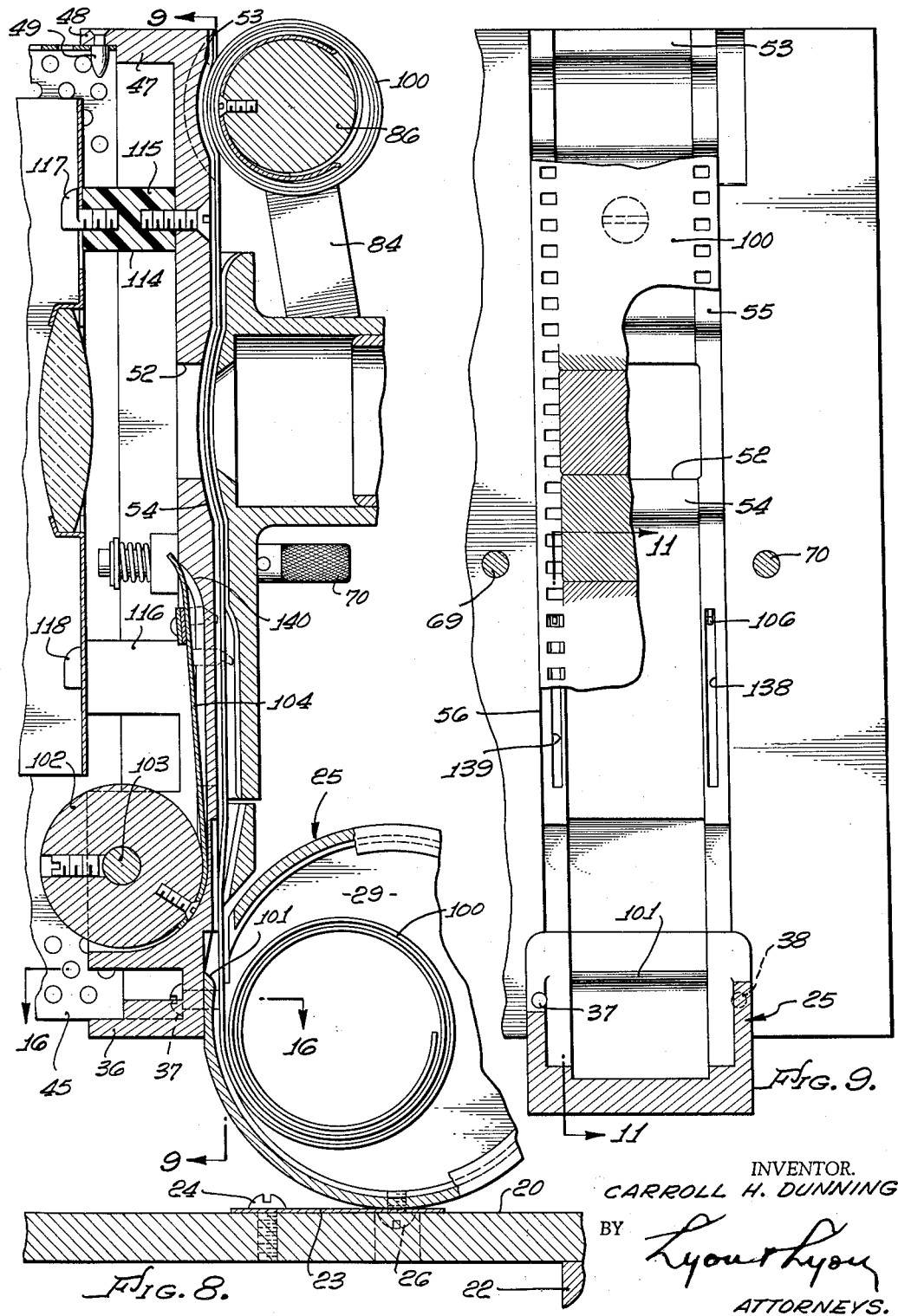

July 9, 1963　　　C. H. DUNNING　　　3,096,683
FILM PROJECTOR
Filed Aug. 28, 1959　　　　　　　　　　　　5 Sheets-Sheet 4
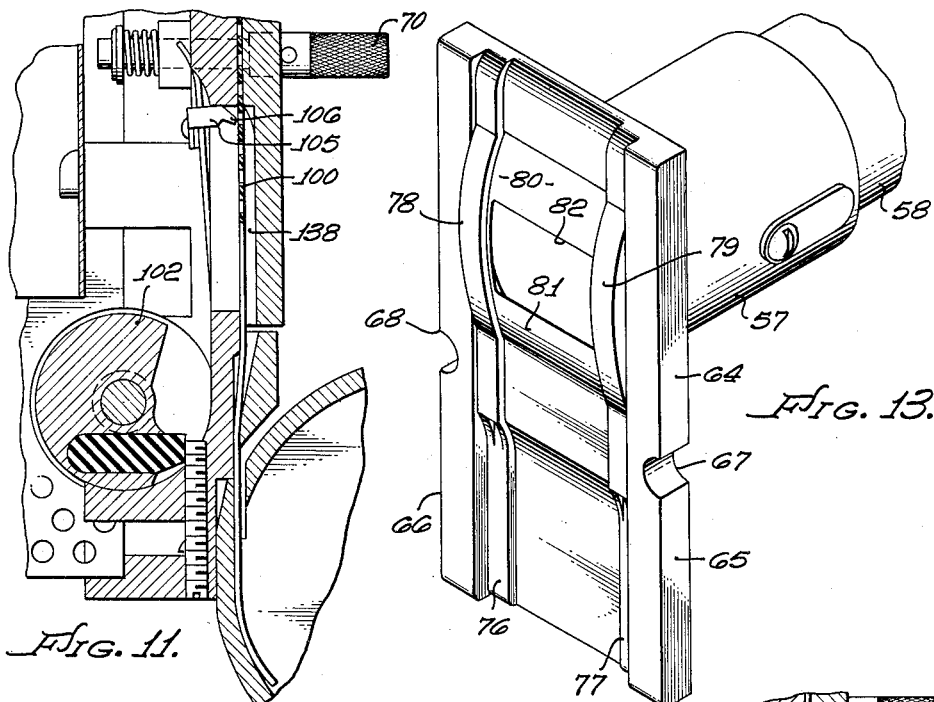
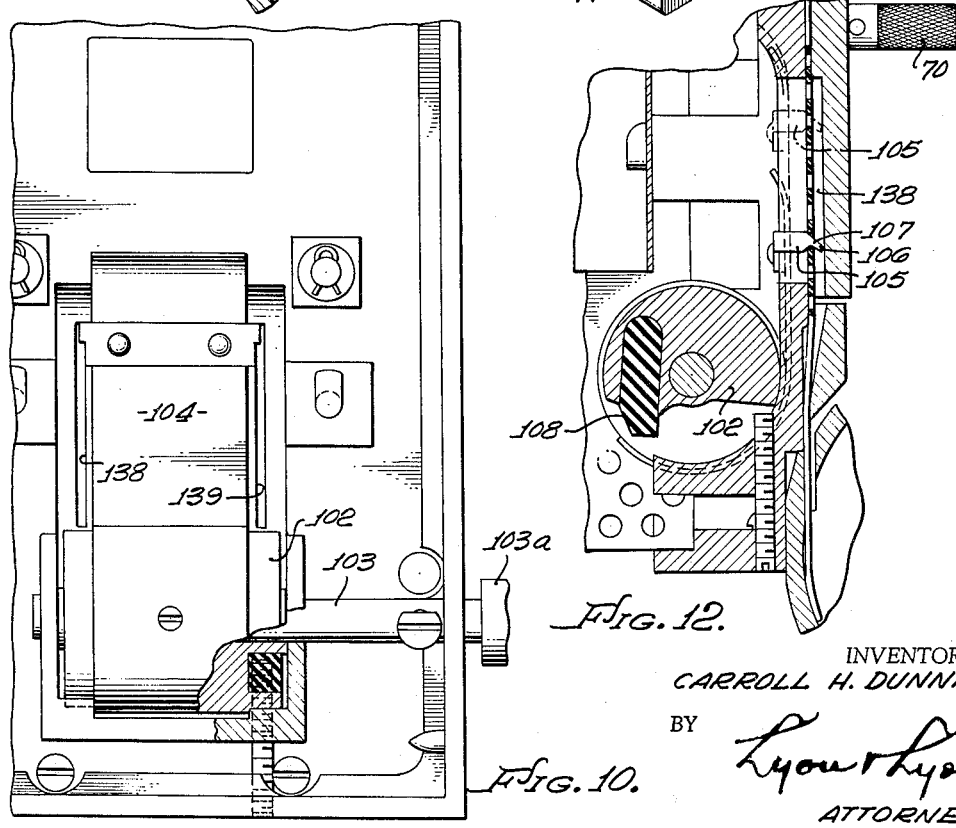
INVENTOR.
CARROLL H. DUNNING.
BY
Lyon & Lyon
ATTORNEYS.

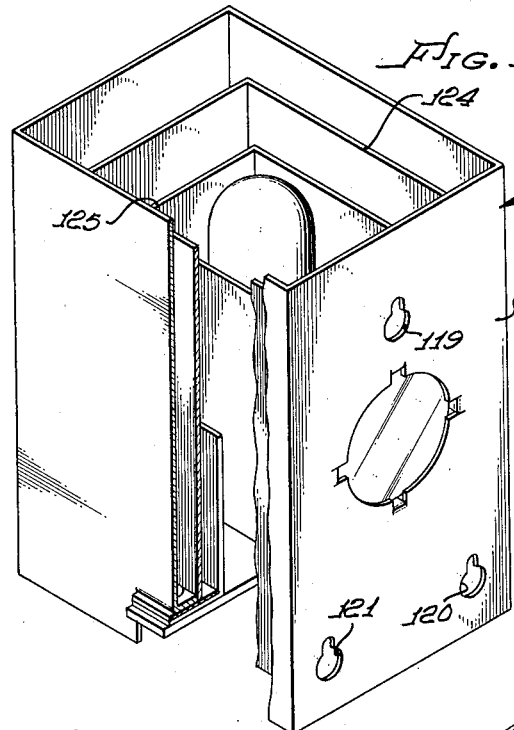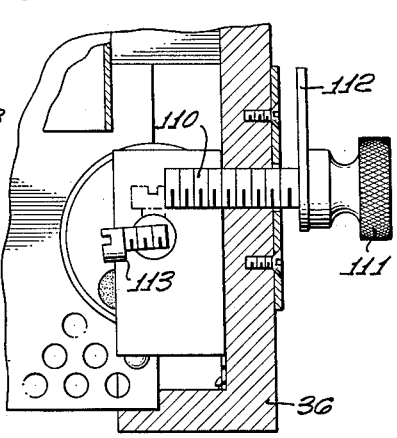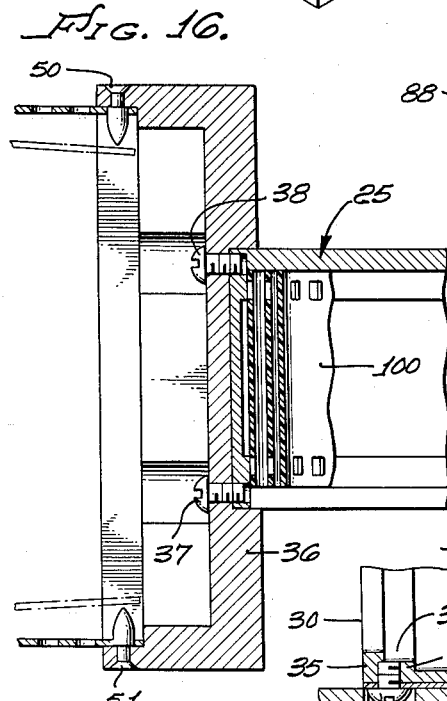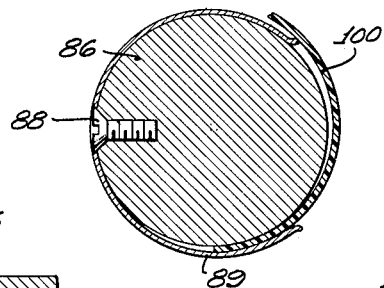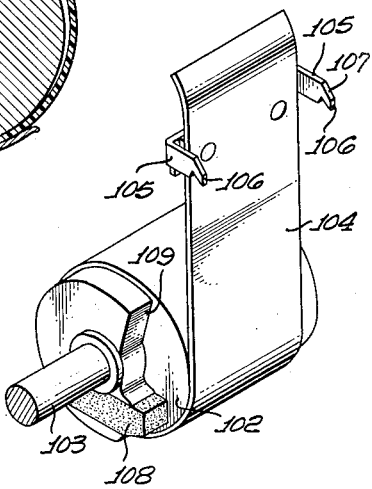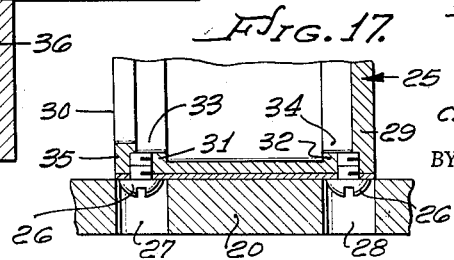
INVENTOR.
CARROLL H. DUNNING.
BY
ATTORNEYS.

United States Patent Office 3,096,683
Patented July 9, 1963

3,096,683
FILM PROJECTOR
Carroll H. Dunning, 4337 Clybourn Ave.,
North Hollywood, Calif.
Filed Aug. 28, 1959, Ser. No. 836,702
1 Claim. (Cl. 88—28)

This invention relates to a film projector and more particularly to a projector of the type for projecting single frames of a continuous film one by one such as commonly used in lectures, sermons and the like.

It is an object of this invention to provide a film projector of the type described which is simple, durable and economic and which involves novel features as to cooling, tilting, film advance, film storage and film registry means.

It is a feature of this invention that a face plate is used upon the projector presenting a fixed undulating track against which the resilient film is pressed for preventing backward movement of the film and for securely registering the film to be projected.

It is a salient feature of this invention that the path for the film defined by the undulating track is fixed in width to the result that no resilient pressure plate bears against the film.

It is a further feature of this invention that the fixed path or track for the film is arranged to contact the film being projected at its outer edges only.

It is another feature of this invention that very simple, adjustable yet positive film advance mechanism is employed which engages the film only during advancement and disengages the film upon retraction.

It is a further feature of this invention that novel resilient means are used for raising and lowering the attitude of the projector, i.e., the axis of projection of the projected film.

It is a further feature of this invention that nested shells within a perforated housing are provided for thoroughly ventilating and heat insulating the projecting lamp.

It is a further feature of this invention that a lamp housing is provided including a plurality of nested shells, the outer of which has perforated walls, said nested shells being spaced and of progressively greater length from the inside to the outside for improving the cooling, ventilating and protecting characteristics of the lamp housing, by in effect providing the venturi action on the cooling air.

These and other objects, features and advantages will be apparent from the annexed specification in which:

FIGURE 1 is a front view.
FIGURE 2 is a section taken along the line 2—2 of FIGURE 5 with parts broken away for clarity of illustration and partly in section.
FIGURE 3 is a view taken along the line 3—3 of FIGURE 1.
FIGURE 4 is an enlarged fragmentary view similar to FIGURE 3 of the roll latch mechanism.
FIGURE 5 is a side view taken along the line 5—5 of FIGURE 1 with parts broken away for clarity of illustration and partly in section.
FIGURE 6 is a section taken along the lines 6—6 of FIGURE 5.
FIGURE 7 is a section taken along the line 7—7 of FIGURE 1.
FIGURE 8 is a section taken along the line 8—8 of FIGURE 1.
FIGURE 9 is a view taken along the line 9—9 of FIGURE 8.
FIGURE 10 is a section taken along the line 10—10 of FIGURE 5.
FIGURE 11 is a section taken along the line 11—11 of FIGURE 9.
FIGURE 12 is a view similar to FIGURE 11 with parts in different operative positions.
FIGURE 13 is a perspective elevation of the lens housing and associated mechanism.
FIGURE 14 is a perspective elevation with parts broken away for clarity of illustration of the lamp housing.
FIGURE 15 is a section taken along the line 15—15 of FIGURE 1.
FIGURE 16 is a section taken along the line 16—16 of FIGURE 8.
FIGURE 17 is a section taken along the line 17—17 of FIGURE 5.
FIGURE 18 is a section taken along the line 18—18 of FIGURE 1.
FIGURE 19 is a perspective elevation of the film advance mechanism.

Referring now more particularly to the drawings, the device is mounted upon a base 20 which in turn is mounted on a pair of end legs 21 and 22. A leaf spring 23 is secured to the base 20 as by screw 24 and a generally tubular aluminum film housing 25 is secured to the leaf spring 23 as by screws 26. A pair of openings 27 and 28 are formed in the base 20 to accommodate the heads of screws 26 so that the housing 25 is free to move upwardly on flexing of the spring 23. The housing 25 has a rear wall 29 and is open at the other end as at 30. The cylindrical walls of the housing are provided with shoulders 31 and 32 forming rails 33 and 34 upon which the edges only of the film being housed may ride. The front side of the housing 25 is provided with a ring 35 to act as a retainer for the film riding on the rail 33. The housing 25 is attached to the face plate 36 of the projector by means of a pair of screws 37 and 38. A bracket 39 is attached to the base 20 as by screws 40 and conveniently carries a rubber grommet 41 for the lead wires 42 of the projector. The bracket 39 carries a pin 43 which is riveted thereto and the pin 43 rides in a slot 44 formed in the rear of the perforated housing 45. A knurled nut 46 engages the pin 43. When it is desired to elevate or depress the attitude of the projector, the knurled nut 46 is loosened, the pin 43 is caused to travel in the slot 44 and the knurled nut 46 is then tightened down. This will cause a movement of the housing 25 as if the pin 43 has been moved upward in the slot 44, i.e. the rear end of the housing 45 has been depressed, the housing 25 will move upward as the spring 23 is caused in effect to curl about the same thus elevating the angle of attitude of the projector lens.

The face plate 36 is in the form of a plate having a rectangular side and end wall 47 which has a shoulder 48 around its periphery for receiving and seating the inner ends of the walls of the perforated housing 45. The perforated housing 45 is open at the bottom and front end which permits the side walls to be sprung inwardly to receive pins 49, 50 and 51, respectively, as best illustrated in FIGURES 3, 8 and 16, the heads of the pins simply entering the perforations in the perforated housing 45. The plate 36 is provided with a circular opening 52, and on its face is provided with a groove or indentation 53 and a second groove or indentation 54. A track is formed upon the face of the plate 36 by providing a pair of rails 55 and 56.

Referring now more particularly to FIGURES 6 and 13, there is shown a projecting lens system including a tubular piece 57 adapted to telescopically receive lens holder 58 which in turn mounts the optic lenses 59, 60 and 61. Spring 62 yieldingly urges a ball 63 into contact with the lens holder 58. The tubular member 57 is mounted upon a frame member 64 provided with a pair of side rails 65 and 66 notched as at 67 and 68. The plate 36 carries pins 69 and 70 which have shoulders 71 adapted to be engaged by coil springs 72, the other ends of which engage bosses 73 on plate 36. The pins 69 and 70 carry sidewise projecting pins 74 and 75. The forward extending ends of the pins 69 and 70 are enlarged and knurled. The assembly shown in FIGURE 13 is adapted to be removably placed upon the face of the plate 36 by simply pulling out on and turning the pins 69 and 70 so as to seat the pins in the indentations 67 and 68 with the portions 74 and 75 in retaining position.

It will be appreciated that by forming the face plate and lens assembly and assembling same as above-defined a fixed path is provided for the film which will ride the rails 55, 56 and 76, 77 in continuous contact therewith at the marginal portions only, as is most clearly shown in FIGURE 7, and it will be further appreciated that the lens assembly is in fixed relation to the face plate and is not spring-biased against the plate in any way.

Referring again to FIGURES 6 and 13, rails 76 and 77 adapted to be engaged by the film are formed on the inner face of the frame member, and these rails project inwardly in arcuate shaped portions 78 and 79 between which are arcuate portions 80 and 81 framing the viewing opening 82. Screwed into the cylindrical member 57 is a screw 83 about which is an arm 84. A coil spring is provided between the arm 84 and the housing 57 and has one end engaging the arm 84 and the other end engaging the housing 57, as best illustrated in FIGURE 6. The arm 84 carries at its other end a screw 85 which pivotally mounts a roller 86. The roller 86 has a knurled extension 87 and has affixed thereto as by a screw 88 a clamping spring 89. The arm 84 is normally biased by the coil spring associated thereto so as to engage the roller 86 with the indentation 53. However, a detent 90 carried by the plate 36 cooperates with a crank shaped member 91 carried by the arm 84 to hold the arm 84 away from the plate 36 in the position shown in dotted lines in FIGURE 3 during loading of the roller.

Film as indicated by the numeral 100 is normally wound on the roller 86 with the end fastened under the film retaining spring 89, as shown in FIGURES 8 and 18. The film passes along the face of the plate 36 and along the rails 55 and 56 on the plate 36 and the rails 76 and 77 of the lens assembly device as indicated, the lower end of the film entering an opening 101 in the housing 25 where the film is coiled as indicated in FIGURE 8. A film advancing mechanism is best shown in FIGURES 8, 10, 11, 12, and 19. A roller 102 is rotatably mounted in the plate 36 and a shaft 103 carries a knurled knob 103a for turning the roller 102. The roller 102 carries a thin flat spring 104, a portion of which is wound on the roller 102 and the remainder of which extends upwardly and carries a pair of pawls 105. The plate 36 is provided with a pair of slots 138 and 139 through which the pawls 105 may extend. Each of the pawls 105 has an end portion 106 adapted to engage the sprocket holes of the film and a cam portion 107 adapted to disengage the pawl from the sprocket holes upon upward movement of the spring 104. Plate 36 adjacent the upper end of spring 104 is cut to present an outwardly curving surface 140 which assures withdrawal of pawls 105 from the sprocket holes on upward movement of spring 104. A rubber shock absorber 108 is carried by the roller 102, and a portion of the roller is relieved as at 109 to form a stop. The plate 36 carries a screw 110 having a knurled knob 111 thereon and an indicator 112, and the shaft 103 carries a screw 113.

The plate 36 mounts a plastic sleeve 114 as by screw 115, and a pair of bosses 116 are formed upon the rear face of the plate 36, and the bosses 116 and sleeve 114 receive screws 117 and 118 which have machined heads adapted to receive bayonet slots 119, 120 and 121 formed in the front plate of the lamp housing 122. Lamp housing 122 is most clearly shown in FIGURES 3, 5 and 14 and consists of three spaced boxes 123, 124 and 125 nested as shown. Box 125 has an opening 126 therein and aligned opening 127 in which is mounted lens 128. Box 124 is provided with an opening 129 and an aligned opening 130. Box 123 is provided with a reflector or curved mirror 131 and with an opening 132 in which is mounted a lens 133. The provision of the series of nested boxes 123, 124 and 125 provides spaced air spaces which permits air entering through the perforated housing 45 to flow as indicated by the arrows and cool the lamp and lamp housing. As is most clearly shown in FIGURE 5, the outer perforated housing 45 extends downwardly the greatest distance and upwardly the greatest distance of any of the shells surrounding the lamp housing and the outer shell 123 extends downwardly and upwardly a greater distance than the next inner shell 124, which shell 124 extends downwardly and upwardly a greater distance than the innermost shell 125. A lamp socket 134 mounting a lamp 135 is provided in box 125. The operation of the above-described device is as follows: Assuming that the roller 86 is loaded with film and the film is threaded as indicated in FIGURE 8 and it is desired to project another picture, the operator will turn the knob 103a to cause the spring 104 to move downwardly. As it does so, the detents 106 enter the sprocket holes in the film and move the film downwardly the desired distance. Adjustment of the amount of movement obtained on each movement is made by adjusting the screw 110 by means of knob 111 so as to engage screw 113 at either an earlier or later point. The arcuate portions of rails 78 and 79 and the arcuate portions 80 and 81 engage the film and force the same into firm engagement with the indented portion in the face 52 of plate 36 and assure accurate registry of the picture.

While there has been described what is at present considered the preferred embodiment of the invention, it will be understood by those skilled in the art that various changes and alterations may be made therein without departing from the essence of the invention and it is intended to cover herein all such changes and alterations as come within the true spirit and scope of the annexed claim.

I claim:

A projector comprising: a plate having an opening therein through which a picture may be projected; a projection lens assembly fixed on said plate; indentations on said plate and complementing bulges on the inner portion of said lens assembly forming a fixed undulating path for the passage of film past said opening; a pair of slots in said plate; a leaf spring in said housing adjacent said path and below said opening; a pair of pawls carried by said leaf spring and projecting through said slots; cam faces on said pawls and cooperating curved surfaces on said plate adapted to be engaged by said cam faces whereby said pawls are adapted to engage in sprocket holes in said film on downward movement of said leaf spring to advance said film and to disengage from said sprocket holes upon upward movement of said leaf spring; a roller rotatably mounted in said housing, the lower end of said leaf spring being attached to said roller, the free end of said leaf spring extending upwardly and normally bearing against said plate and means for rotating said roller to raise or lower said free end of said spring; and said housing including a perforated shell including a top, two sides and a rear end, a plurality of box-like, nested shells within said perforated shell and a lamp within the innermost shell.

References Cited in the file of this patent

UNITED STATES PATENTS

| | | |
|---|---|---|
| 1,854,832 | Gastonguay et al. | Apr. 19, 1932 |
| 1,884,732 | Kindelmann et al. | Oct. 25, 1932 |
| 2,048,214 | Howell et al. | July 21, 1938 |
| 2,518,282 | Canaday | Aug. 8, 1950 |
| 2,534,732 | Perillo | Dec. 19, 1950 |
| 2,587,123 | Dunning et al. | Feb. 26, 1952 |
| 2,922,334 | Krull | Jan. 26, 1960 |
| 2,971,435 | Singleterry | Feb. 14, 1961 |